United States Patent
Lim et al.

(10) Patent No.: US 12,027,474 B2
(45) Date of Patent: Jul. 2, 2024

(54) LASER-DETECTION DEVICES INCLUDING A VOLTAGE-CONTROLLED MAGNETIC-TUNNELING-JUNCTION LAYER STACK

(71) Applicant: GlobalFoundries Singapore Pte. Ltd., Singapore (SG)

(72) Inventors: Jia Hao Lim, Singapore (SG); Vinayak Bharat Naik, Singapore (SG)

(73) Assignee: GlobalFoundries Singapore Pte. Ltd., Singapore (SG)

(*) Notice: Subject to any disclaimer, the term of this patent is extended or adjusted under 35 U.S.C. 154(b) by 204 days.

(21) Appl. No.: 17/862,487

(22) Filed: Jul. 12, 2022

(65) Prior Publication Data
US 2024/0021543 A1 Jan. 18, 2024

(51) Int. Cl.
*H01L 23/00* (2006.01)
(52) U.S. Cl.
CPC .................. *H01L 23/573* (2013.01)
(58) Field of Classification Search
CPC ...................................... H01L 23/573
USPC ............................................. 257/211
See application file for complete search history.

(56) References Cited

U.S. PATENT DOCUMENTS

| | | | |
|---|---|---|---|
| 7,440,479 B2 | 10/2008 | Nurmikko | |
| 9,355,699 B2 | 5/2016 | Khalili Amiri et al. | |
| 9,379,066 B2 | 6/2016 | Marinet et al. | |
| 2019/0189908 A1* | 6/2019 | Ebrahimi | H10N 50/10 |
| 2023/0298646 A1* | 9/2023 | Wu | G11C 11/161 |
| | | | 365/158 |

OTHER PUBLICATIONS

M. Kharbouche-Harrari et al., "Dual Detection of Heating and Photocurrent attacks (DDHP) Sensor using Hybrid CMOS/STT-MRAM," 2019 IEEE 25th International Symposium on On-Line Testing and Robust System Design (IOLTS), pp. 322-327, (2019).
Harrari et al., "Impact of a Laser Pulse on a STT-MRAM Bitcell", IEEE International Symposium on On-Line Testing And Robust System Design (IOLTS), 2018, pp. 243-244 (2018).
W. Kang et al., "Voltage-Controlled MRAM for Working Memory: Perspectives and Challenges", Design, Automation & Test in Europe Conference & Exhibition (DATE), pp. 542-547 (2017).

* cited by examiner

*Primary Examiner* — Ajay Arora
(74) *Attorney, Agent, or Firm* — Thompson Hine LLP

(57) ABSTRACT

Structures for a laser-detection device including a magnetic-tunneling-junction layer stack and related methods. The structure has a magnetic-tunneling-junction layer stack including a fixed layer, a free layer, and an insulating spacer between the fixed layer and the free layer, and a power supply coupled to the magnetic-tunneling-junction layer stack. The power supply is configured to bias the magnetic-tunneling-junction layer stack to modulate an energy barrier of the magnetic-tunneling-junction layer stack for switching between a low-resistance state and a high-resistance state in response to receiving incident electromagnetic radiation of an intensity.

20 Claims, 1 Drawing Sheet

LASER-DETECTION DEVICES INCLUDING A VOLTAGE-CONTROLLED MAGNETIC-TUNNELING-JUNCTION LAYER STACK

BACKGROUND

This disclosure relates to integrated circuits and semiconductor device fabrication and, more specifically, to structures for a laser-detection device that include a magnetic-tunneling-junction layer stack and related methods.

The integrated circuits in a security system or a computing system are susceptible to an external attack using a laser and another type of high-energy electromagnetic radiation, such as X-rays. In particular, a laser can be used to tamper with an integrated circuit by disturbing or hindering normal operation. For example, a laser can be used to measure and control logic levels in the transistors of an integrated circuit.

A magnetic-tunneling-junction layer stack may include a pinned or fixed layer, a free layer, and a thin tunnel barrier layer arranged between the fixed layer and the free layer. The magnetization of the fixed layer is fixed in its magnetic orientation, and the magnetization of the free layer can be switched relative to the fixed layer by, for example, the application of a programming current. In particular, the magnetic orientations of the fixed and free layers may be programmed by the programming current to have either a parallel state with low electrical resistance across the layers or an antiparallel state with high electrical resistance across the layers.

Improved structures for a laser-detection device that include a magnetic-tunneling-junction layer stack and related methods are needed.

SUMMARY

According to an embodiment of the invention, a structure comprises a magnetic-tunneling-junction layer stack including a fixed layer, a free layer, and an insulating spacer between the fixed layer and the free layer, and a power supply coupled to the magnetic-tunneling-junction layer stack. The power supply is configured to bias the magnetic-tunneling-junction layer stack to modulate an energy barrier of the magnetic-tunneling-junction layer stack for switching between a low-resistance state and a high-resistance state in response to receiving incident electromagnetic radiation of an intensity.

According to an embodiment of the invention, a method comprises forming a magnetic-tunneling-junction layer stack including a fixed layer, a free layer, and an insulating spacer between the fixed layer and the free layer, and coupling a power supply to the magnetic-tunneling-junction layer stack. The power supply is configured to bias the magnetic-tunneling-junction layer stack to modulate an energy barrier of the magnetic-tunneling-junction layer stack for switching between a low-resistance state and a high-resistance state in response to receiving incident electromagnetic radiation of an intensity.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
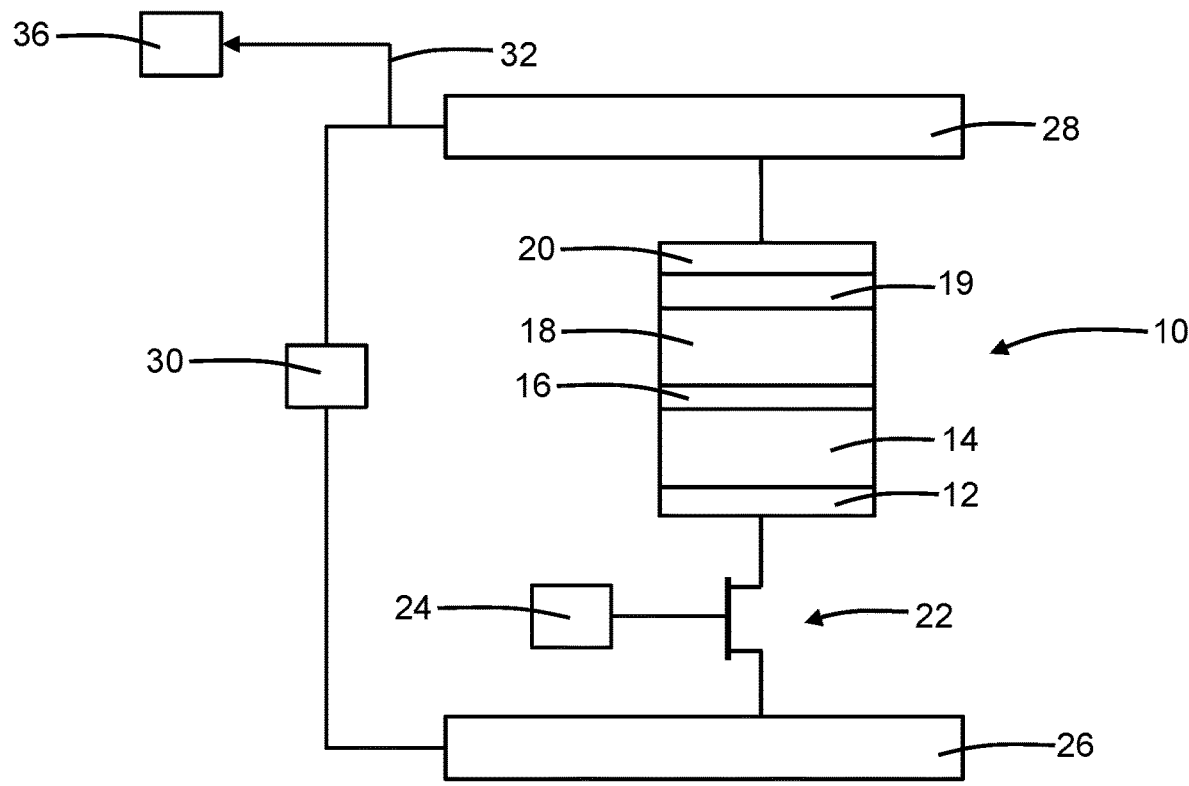
FIG. 1 is a diagrammatic view of a structure for a laser-detection device in accordance with embodiments of the invention.

With reference to FIG. 1 and in accordance with embodiments of the invention, a magnetic-tunneling-junction (MTJ) layer stack 10 of a structure for a laser-detection device includes a bottom electrode 12, a fixed layer 14, an insulating spacer 16, a free layer 18, and a top electrode 20. The fixed layer 14 may be comprised of a ferromagnetic material, such as a cobalt-iron-boron alloy, having a fixed magnetic orientation. The insulating spacer 16 is positioned between the fixed layer 14 and the free layer 18, and may define a single tunnel barrier layer. The insulating spacer 16 may be comprised of a non-magnetic dielectric material, such as magnesium oxide, that is an electrical insulator. In an embodiment, the insulating spacer 16 may have a thickness in a range of 1 nanometer to 5 nanometers. The free layer 18 has a magnetic orientation that may be switched relative to the fixed magnetic orientation of the fixed layer 14 to be either parallel or antiparallel. The free layer 18 may be positioned on the insulating spacer 16. In an embodiment, the free layer 18 may be comprised of a ferromagnetic material, such as a cobalt-iron-boron alloy.

An in-plane magnetic layer 19 may be disposed between the free layer 18 and the top electrode 20. In an embodiment, the in-plane magnetic layer 19 may be comprised of a ferromagnetic material, such as a cobalt-iron-boron alloy. The in-plane magnetic layer 19 has in-plane magnetic anisotropy, in contrast to the perpendicular-to-plane magnetic anisotropy of the free layer 18. Consequently, the in-plane magnetic layer 19 and the free layer 18 have different magnetic anisotropies. In an embodiment, the in-plane magnetic layer 19 may have a thickness in a range of 1 nanometer to 50 nanometers. In an embodiment, the in-plane magnetic layer 19 and the free layer 18 may be considered to constitute a composite free layer.

An access transistor 22 of the structure for the laser-detection device is connected in series to the MTJ layer stack 10 to provide a one-transistor/one-MTJ stack structure. The access transistor 22 has a gate that is coupled to a word line 24, a drain that is coupled via the bottom electrode 12 to the fixed layer 14, and a source that is coupled to a source line 26. The access transistor 22 may be a field-effect transistor, such as a planar field-effect transistor or a fin-type field-effect transistor, that is formed on a substrate by front-end-of-line processes. A bit line 28 is coupled via the top electrode 20 to the free layer 18. The MTJ layer stack 10, the word line 24, the source line 26, and the bit line 28 may be formed in a back-end-of-line stack by back-end-of-line processes. An output line 32 in the back-end-of-line stack may couple the bit line 28 to circuitry 36 configured to read the electrical resistance state of the MTJ layer stack 10.

A power supply 30 of the structure for the laser-detection device may be coupled by the source line 26, the access transistor 22, and the bottom electrode 12 to the fixed layer 14 and coupled by the bit line 28 and the top electrode 20 to the free layer 18. In an embodiment, the power supply 30 may be coupled to the fixed layer 14 and the free layer 18 of the MTJ layer stack 10 with a fixed polarity that does not change during operation when biasing the MTJ layer stack 10 with a bias voltage. For example, a positive terminal of the power supply 30 may be coupled to the free layer 18 and a negative terminal of the power supply 30 may be coupled to the fixed layer 14. A control signal may be applied to the gate of the access transistor 22 to permit the power supply 30 to apply and/or remove a bias voltage across the MTJ layer stack 10. In an embodiment, the bias voltage applied by the power supply 30 across the MTJ layer stack 10 may be pulsed.

The magnetization of the fixed layer of the MTJ layer stack 10 has a pinned magnetic orientation that is static or constant, whereas the magnetization of the free layer 18 is variable. The magnetization of the free layer 18 can be switched or changed to be parallel to the magnetization of the fixed layer 14, which produces a low-resistance state across the MTJ layer stack 10. The magnetization of the free layer 18 can be switched or changed to be antiparallel to the magnetization of the fixed layer 14, which produces a high-resistance state across the MTJ layer stack 10. The different states of electrical resistance are stable and persistent. An energy barrier must be overcome to permit switching between the different resistance states.

The bias voltage applied from the power supply 30 to the MTJ layer stack 10 is configured to alter the energy barrier for switching between the parallel and antiparallel conditions using the voltage-controlled magnetic anisotropy (VCMA) effect. For example, increasing the bias voltage applied from the power supply 30 to the MTJ layer stack 10 may lower the energy barrier required to switch the MTJ layer stack 10. Specifically, the material of the free layer 18 has a perpendicular magnetic anisotropy (i.e., a preferred magnetic axis) that can be modulated by the applied bias voltage to lower the energy barrier for switching between the low-resistance state and the high-resistance state. The applied bias voltage can be selected to adjust (e.g., lower) the energy barrier such that the MTJ layer stack 10 can be switched by the thermal stress (i.e., Joule heating and the accompanying temperature increase) caused by receiving incident laser light, or a different type of electromagnetic radiation, with an intensity that is greater than or equal a particular threshold intensity. In an embodiment, the applied bias voltage may be selected such that the energy barrier under biasing is positive. The biased MTJ layer stack 10 is configured to sense an attack from a laser with an intensity of laser light that is greater than or equal to the threshold intensity such that the energy barrier is overcome and switching occurs. The utilization of the MTJ layer stack 10 to be sensitive to incident laser light differs from a conventional use in a VCMA magnetoresistive memory cell in which a directional programming current is used to write different memory states characterized by the parallel and antiparallel conditions.

Readout of the magnetization state of the free layer 18 can be made via the output line 32 as facilitated by the circuitry 36. Specifically, the resistance read from the MTJ layer stack 10 may be compared to reference values, such as the median value of the resistance of the MTJ layer stack 10 in the parallel state and the median resistance of the MTJ layer stack 10 in the antiparallel state. In an embodiment, the MTJ layer stack 10 may be initially placed in the high-resistance antiparallel state, the high-resistance state read from the MTJ layer stack 10 may indicate the absence of a laser attack, and a low-resistance parallel state read from the MTJ layer stack 10 may indicate that a laser attack has occurred.

Following a laser attack producing a low-resistance state, the MTJ layer stack 10 may be reset to a high-resistance state through a bias voltage applied by the power supply 30.

The MTJ layer stack 10, access transistor 22, and power supply 30 provide a structure for a laser-detection device in which the MTJ layer stack 10 provides an embedded on-chip sensor or detector with a tunable laser intensity threshold dependent on a bias voltage applied from the power supply. A laser-detection device based on the biased MTJ layer stack 10 may exhibit a reduced energy consumption compared to other types of laser-detection devices. A laser-detection device based on the biased MTJ layer stack 10 may also be characterized by an improved sensitivity compared to other types of laser-detection devices.

Figure 2:
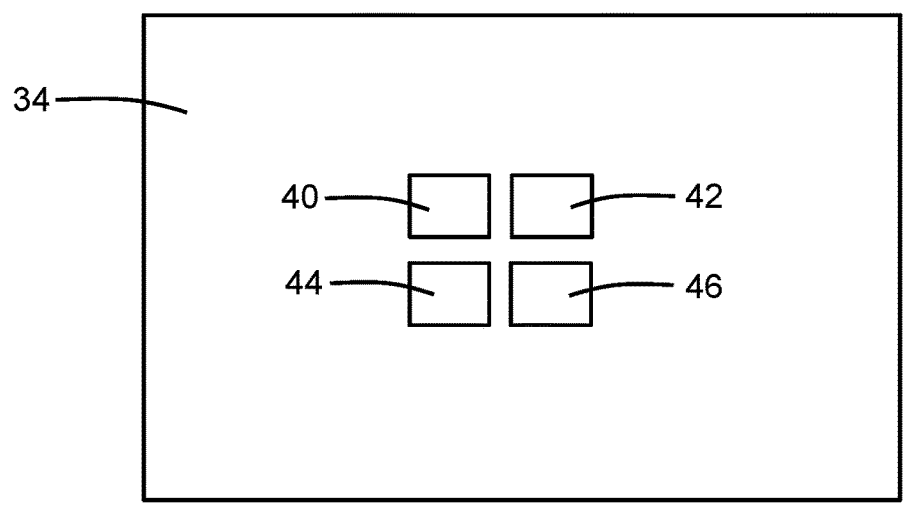
FIG. 2 is a diagrammatic view of multiple structures providing laser-detection devices that are arranged on a chip in accordance with alternative embodiments of the invention.

With reference to FIG. 2 and in accordance with embodiments, several instances 40, 42, 44, 46 of the structure for the laser-detection device may be placed on a chip 34. In an embodiment, the instances 40, 42, 44, 46 may be placed on a single chip 34. In an embodiment, the different instances 40, 42, 44, 46 may be clustered together in a given area on the chip 34, as shown. For example, the layer stacks of the instances 40, 42, 44, 46 of the laser-detection devices may be positioned in the back-end-of-line stack within a distance that is less than or equal to 1000 microns of each other in a cluster.

Each of the instances 40, 42, 44, 46 includes an MTJ layer stack 10, an associated access transistor 22, and a power supply 30, as shown in FIG. 1, such that different bias voltages can be independently applied to the MTJ layer stacks 10 of the different instances 40, 42, 44, 46. As a result, the MTJ layer stack 10 of each of the instances 40, 42, 44, 46, when biased, can be configured to receive and sense incident laser light, or a different type of electromagnetic radiation, of a different intensity such that multiple different intensity levels can be sensed.

In an embodiment, the MTJ layer stacks 10 of the different instances 40, 42, 44, 46 may be identical. In an embodiment, the fixed layer 14 of each MTJ layer stack 10 may be comprised of the same material with the same thickness. In an embodiment, the insulating spacer 16 of each MTJ layer stack 10 may be comprised of the same material with the same thickness. In an embodiment, the free layer 18 of each MTJ layer stack 10 may be comprised of the same material with the same thickness. In an embodiment, the MTJ layer stacks 10 of the different instances 40, 42, 44, 46 may have the same fixed layer 14, insulating spacer 16, and free layer 18, as well as the same energy barrier in the absence of biasing. The variation in the bias voltage may be used to independently modulate the energy barrier, which controls the specific laser intensity threshold that causes switching between resistance states, of the MTJ layer stacks 10 of the different instances 40, 42, 44, 46. The voltage modulation permits the same MTJ layer stack 10 to be replicated in multiple instances 40, 42, 44, 46 on a chip 34 to provide distinct laser-detection devices for sensing different levels of incident laser intensity. The different instances 40, 42, 44, 46 may also be used to differentiate serendipitous laser light from weak light exposure through voltage modulation of the respective energy barriers. The different instances 40, 42, 44, 46 may also be used to detect different laser intensities for different chips in the same intermediate product or end product to protect from external laser exposure.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
    a first magnetic-tunneling-junction layer stack including a fixed layer, a free layer, and an insulating spacer between the fixed layer and the free layer; and
    a first power supply coupled to the first magnetic-tunneling-junction layer stack, the first power supply configured to bias the first magnetic-tunneling-junction layer stack to modulate a first energy barrier of the first magnetic-tunneling-junction layer stack for switching between a low-resistance state and a high-resistance state in response to receiving incident electromagnetic radiation of a first intensity.

2. The structure of claim 1 further comprising:
    a second magnetic-tunneling-junction layer stack including a fixed layer, a free layer, and an insulating spacer between the fixed layer and the free layer; and
    a second power supply coupled to the second magnetic-tunneling-junction layer stack, the second power supply configured to bias the second magnetic-tunneling-junction layer stack to modulate a second energy barrier of the second magnetic-tunneling-junction layer stack for switching between a low-resistance state and a high-resistance state in response to receiving incident electromagnetic radiation of a second intensity.

3. The structure of claim 2 wherein the fixed layer of the second magnetic-tunneling-junction layer stack comprises a first material having a first thickness, the fixed layer of the second magnetic-tunneling-junction layer stack comprises a second material having a second thickness, the first thickness is equal to the second thickness, and the first material is the same as the second material.

4. The structure of claim 2 wherein the free layer of the second magnetic-tunneling-junction layer stack comprises a first material having a first thickness, the free layer of the second magnetic-tunneling-junction layer stack comprises a second material having a second thickness, the first thickness is equal to the second thickness, and the first material is the same as the second material.

5. The structure of claim 2 wherein the insulating spacer of the second magnetic-tunneling-junction layer stack comprises a first material having a first thickness, the insulating spacer of the second magnetic-tunneling-junction layer stack comprises a second material having a second thickness, the first thickness is equal to the second thickness, and the first material is the same as the second material.

6. The structure of claim 2 wherein the first power supply is configured to bias the first magnetic-tunneling-junction layer stack with a first bias voltage, and the second power supply is configured to bias the second magnetic-tunneling-junction layer stack with a second bias voltage different from the first bias voltage.

7. The structure of claim 6 wherein the first energy barrier in the absence of the first bias voltage is equal to the second energy barrier in the absence of the second bias voltage.

8. The structure of claim 6 wherein the first energy barrier in the presence of the first bias voltage is different from the second energy barrier in the presence of the second bias voltage.

9. The structure of claim 2 further comprising:
    a first field-effect transistor having a drain coupled to the fixed layer of the first magnetic-tunneling-junction layer stack; and
    a second field-effect transistor having a drain coupled to the fixed layer of the second magnetic-tunneling-junction layer stack.

10. The structure of claim 2 further comprising:
    a chip that includes the first magnetic-tunneling-junction layer stack and the second magnetic-tunneling-junction layer stack.

11. The structure of claim 1 further comprising:
    a field-effect transistor having a drain connected with the fixed layer of the first magnetic-tunneling-junction layer stack.

12. The structure of claim 1 wherein the first power supply is coupled to the fixed layer and the free layer with a fixed polarity.

13. The structure of claim 11 wherein the first power supply has a negative terminal coupled to the fixed layer and a positive terminal coupled to the free layer.

14. The structure of claim 1 wherein the first power supply is configured to bias the first magnetic-tunneling-junction layer stack with a pulsed voltage.

15. The structure of claim 1 wherein the first magnetic-tunneling-junction layer stack includes an in-plane magnetic layer.

16. The structure of claim 1 wherein the insulating spacer of the first magnetic-tunneling-junction layer stack is a single tunnel barrier layer.

17. The structure of claim 1 wherein the incident electromagnetic radiation of the first intensity is laser light, and the first intensity of the laser light is greater than or equal to a threshold intensity.

18. A method comprising:
   forming a first magnetic-tunneling-junction layer stack including a fixed layer, a free layer, and an insulating spacer between the fixed layer and the free layer; and
   coupling a first power supply to the first magnetic-tunneling-junction layer stack,
   wherein the first power supply is configured to bias the first magnetic-tunneling-junction layer stack to modulate a first energy barrier of the first magnetic-tunneling-junction layer stack for switching between a low-resistance state and a high-resistance state in response to receiving incident electromagnetic radiation of a first intensity.

19. The method of claim 18 further comprising:
   forming a second magnetic-tunneling-junction layer stack including a fixed layer, a free layer, and an insulating spacer between the fixed layer and the free layer; and
   coupling a second power supply to the second magnetic-tunneling-junction layer stack,
   wherein the second power supply is configured to bias the second magnetic-tunneling-junction layer stack to modulate a second energy barrier of the second magnetic-tunneling-junction layer stack for switching between a low-resistance state and a high-resistance state in response to receiving incident electromagnetic radiation of a second intensity.

20. The method of claim 19 wherein the first energy barrier is equal to the second energy barrier, the first power supply is configured to bias the first magnetic-tunneling-junction layer stack with a first bias voltage, and the second power supply is configured to bias the second magnetic-tunneling-junction layer stack with a second bias voltage.

* * * * *